US011594226B2

(12) United States Patent
Liu et al.

(10) Patent No.: US 11,594,226 B2
(45) Date of Patent: Feb. 28, 2023

(54) AUTOMATIC SYNTHESIS OF TRANSLATED SPEECH USING SPEAKER-SPECIFIC PHONEMES

(71) Applicant: International Business Machines Corporation, Armonk, NY (US)

(72) Inventors: Su Liu, Austin, TX (US); Yang Liang, BeiJing (CN); Debbie Anglin, Leander, TX (US); Fan Yang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2 days.

(21) Appl. No.: 17/131,043

(22) Filed: Dec. 22, 2020

(65) Prior Publication Data

US 2022/0199086 A1 Jun. 23, 2022

(51) Int. Cl.
*G10L 15/26* (2006.01)
*G10L 15/02* (2006.01)
(Continued)

(52) U.S. Cl.
CPC ............ *G10L 15/26* (2013.01); *G06F 16/683* (2019.01); *G06F 40/279* (2020.01); *G06F 40/58* (2020.01);
(Continued)

(58) Field of Classification Search
CPC ......... G10L 15/26; G10L 13/02; G10L 15/02; G10L 25/54; G10L 2015/025; G06F 16/683; G06F 40/279; G06F 40/58
See application file for complete search history.

(56) References Cited

U.S. PATENT DOCUMENTS

| 8,290,775 B2 * | 10/2012 | Etezadi | G10L 13/08 |
|---|---|---|---|
| | | | 704/277 |
| 9,094,576 B1 | 7/2015 | Karakotsios | |

(Continued)

FOREIGN PATENT DOCUMENTS

| CN | 1426224 A | 6/2003 |
|---|---|---|
| CN | 109600566 A | 4/2019 |

(Continued)

OTHER PUBLICATIONS

Prajwal et al., Towards Automatic Face-to-Face Translation, Mar. 2020.

(Continued)

*Primary Examiner* — Fariba Sirjani
(74) *Attorney, Agent, or Firm* — Garg Law Firm, PLLC; Rakesh Garg; Nathan Rau

(57) ABSTRACT

An embodiment includes converting an original audio signal to an original text string, the original audio signal being from a recording of the original text string spoken by a specific person in a source language. The embodiment generates a translated text string by translating the original text string from the source language to a target language, including translation of a word from the source language to a target language. The embodiment assembles a standard phoneme sequence from a set of standard phonemes, where the standard phoneme sequence includes a standard pronunciation of the translated word. The embodiment also associates a custom phoneme with a standard phoneme of the standard phoneme sequence, where the custom phoneme includes the specific person's pronunciation of a sound in the translated word. The embodiment synthesizes the translated text string to a translated audio signal including the translated word pronounced using the custom phoneme.

20 Claims, 8 Drawing Sheets

| | | | | | | | | | | | | |
|---|---|---|---|---|---|---|---|---|---|---|---|---|
| | | | | | | 600 | | | | | | |
| VIDEO FILE ID 602 | PERFORMER ID 604 | SCRIPT ID 606 | EMOTIONAL STATE 608 | VOICE ID 610 | FIRST LANG 612 | ORIGINAL AUDIO 614 | ORIGINAL TEXT 616 | SECONDARY LANG 618 | TRANS- LATED TEXT 620 | SYNTHESIZED AUDIO 622 | STARTED TIME STAMP 624 | ENDED TIME STAMP 626 |
| F0011 | PETER | S0001 | HAPPY | PETER/ HAPPY | EN | CAT | CAT | ZH-HANS | 猫 | "猫" (MAO1) | 0'11" | 0'15" |
| F0011 | PETER | S0001 | HAPPY | PETER/ HAPPY | EN | CAT | CAT | RU | КОШКА | "КОШКА" (KO'SHKA) | 0'11" | 0'15" |
| F0011 | PETER | S0001 | HAPPY | PETER/ HAPPY | EN | CAT | CAT | DE | KATZE | KATZE (KA:TZ) | 0'11" | 0'15" |
| F0011 | PETER | S0001 | HAPPY | PETER/ HAPPY | EN | CAT | CAT | ES | GATO | GATO (GA:TO) | 0'11" | 0'15" |
| F0011 | PETER | S0001 | HAPPY | PETER/ HAPPY | EN | CAT | CAT | JA | ネコ | ネコ (NEKO) | 0'11" | 0'15" |

(51) Int. Cl.
  *G10L 13/02* (2013.01)
  *G06F 40/279* (2020.01)
  *G06F 40/58* (2020.01)
  *G10L 25/54* (2013.01)
  *G06F 16/683* (2019.01)

(52) U.S. Cl.
  CPC .............. *G10L 13/02* (2013.01); *G10L 15/02* (2013.01); *G10L 25/54* (2013.01); *G10L 2015/025* (2013.01)

(56) References Cited

U.S. PATENT DOCUMENTS

| | | | |
|---|---|---|---|
| 9,479,736 B1 | 10/2016 | Karakotsios | |
| 9,922,641 B1* | 3/2018 | Chun | G10L 15/07 |
| 2003/0028380 A1* | 2/2003 | Freeland | G10L 13/00 704/260 |
| 2004/0111271 A1* | 6/2004 | Tischer | G10L 13/033 704/277 |
| 2004/0225498 A1* | 11/2004 | Rifkin | G10L 17/02 704/250 |
| 2006/0069567 A1* | 3/2006 | Tischer | G10L 13/033 704/260 |
| 2006/0227945 A1* | 10/2006 | Runge | H04M 3/5307 379/88.05 |
| 2006/0285654 A1* | 12/2006 | Nesvadba | G10L 15/26 348/E5.122 |
| 2008/0034044 A1* | 2/2008 | Bhakta | G06Q 10/00 709/206 |
| 2008/0059147 A1* | 3/2008 | Afify | G06Q 30/02 704/5 |
| 2008/0291325 A1* | 11/2008 | Teegan | G10L 13/033 704/258 |
| 2009/0006097 A1* | 1/2009 | Etezadi | G10L 13/08 704/277 |
| 2010/0198577 A1* | 8/2010 | Chen | G10L 15/187 704/2 |
| 2010/0217600 A1* | 8/2010 | Lobzakov | G10L 13/00 704/260 |
| 2011/0093272 A1* | 4/2011 | Isobe | G10L 13/10 704/258 |
| 2011/0288861 A1* | 11/2011 | Kurzweil | G09B 5/062 704/E15.044 |
| 2015/0379989 A1* | 12/2015 | Balasubramanian | G06Q 30/0257 704/233 |
| 2017/0116185 A1* | 4/2017 | Erickson | G06F 40/56 |
| 2019/0385588 A1* | 12/2019 | Park | G10L 13/08 |
| 2020/0058289 A1* | 2/2020 | Gabryjelski | G10L 17/00 |
| 2020/0169591 A1 | 5/2020 | Ingel et al. | |
| 2020/0342852 A1* | 10/2020 | Kim | G06N 3/0454 |

FOREIGN PATENT DOCUMENTS

| | | |
|---|---|---|
| KR | 100636386 B1 | 10/2006 |
| KR | 100718713 B1 | 5/2007 |
| WO | 2019124575 A1 | 6/2019 |

OTHER PUBLICATIONS

Anumanchipalli et al., Intent Transfer in Speech-to-Speech Machine Translation, 2012.
ip.com, Automatic Dubbing of Videos with Multiple Speakers, Dec. 26, 2018.
Kanevsky et al., Simple Language Translation, Oct. 30, 2017.
ip.com, A Method of Self-Improvement Translation with Machine Translation and Social Translation, Dec. 13, 2015.
International Phonetic Alphabet Sounds, IPA Chart With Sounds, 2016, https://www.internationalphoneticalphabet.org/ipa-sounds/ipa-chart-with-sounds/.
International Phonetic Association, Full IPA Chart, https://www.internationalphoneticassociation.org/content/full-ipa-chart, 2020.
Antimoon, The sounds of English and the International Phonetic Alphabet, Oct. 15, 2020, http://www.antimoon.com/how/pronunc-soundsipa.htm.
Japanese Up, Japanese Alphabet Pronunciation, https://japaneseup.com/reading-hiragana-pronunciation/, 2020.
Duolingo, Russian: the Alphabet and the Keyboard, Oct. 15, 2020, https://forum.duolingo.com/comment/11449014/Russian-the-Alphabet-and-the-Keyboard.
Harrington et al., Word Boundary Identification from Phoneme Sequence Constraints in Automatic Continuous Speech Recognition, COLING '88: Proceedings of the 12th conference on Computational linguistics, vol. 1, Aug. 1988, pp. 225-230.
Seif, You can now speak using someone else's voice with Deep Learning, Jul. 2, 2019, https://towardsdatascience.com/you-can-now-speak-using-someone-elses-voice-with-deep-learning-8be24368fa2b.
https://s3.amazonaws.com/cdn.innovativelanguage.com/sns/em/content/lp/alphabet/screenshot/japanese.png, 2017.

\* cited by examiner

| VIDEO FILE ID 602 | PERFORMER ID 604 | SCRIPT ID 606 | EMOTIONAL STATE 608 | VOICE ID 610 | FIRST LANG 612 | ORIGINAL AUDIO 614 | ORIGINAL TEXT 616 | SECONDARY LANG 618 | TRANSLATED TEXT 620 | SYNTHESIZED AUDIO 622 | STARTED TIME STAMP 624 | ENDED TIME STAMP 626 |
|---|---|---|---|---|---|---|---|---|---|---|---|---|
| F0011 | PETER | S0001 | HAPPY | PETER/ HAPPY | EN | CAT | CAT | ZH-HANS | 猫 | "猫" (MAO1) | 0'11" | 0'15" |
| F0011 | PETER | S0001 | HAPPY | PETER/ HAPPY | EN | CAT | CAT | RU | КОШКА | "КОШКА" (KO'SHKA) | 0'11" | 0'15" |
| F0011 | PETER | S0001 | HAPPY | PETER/ HAPPY | EN | CAT | CAT | DE | KATZE | KATZE (KA:TZ) | 0'11" | 0'15" |
| F0011 | PETER | S0001 | HAPPY | PETER/ HAPPY | EN | CAT | CAT | ES | GATO | GATO (GA:TO) | 0'11" | 0'15" |
| F0011 | PETER | S0001 | HAPPY | PETER/ HAPPY | EN | CAT | CAT | JA | ネコ | ネコ (NEKO) | 0'11" | 0'15" |

AUTOMATIC SYNTHESIS OF TRANSLATED SPEECH USING SPEAKER-SPECIFIC PHONEMES

BACKGROUND

The present invention relates generally to a method, system, and computer program product for automatic computerized speech processing. More particularly, the present invention relates to a method, system, and computer program product for automatic synthesis of translated speech using speaker-specific phonemes.

Machine translation refers to the use of processor-based systems to convert something from one language to another. There are also human translations and machine-aided human translation in which a human translator performs some or all of the language conversion. However, references made herein to "translations" are referring to machine translations that do not involve a human translator, unless otherwise indicated.

Machine translations may involve automated translation of printed text from one language to another. Automated text translation is a sub-field of computational linguistics in which software is used to translate text from one natural language to another. Systems that perform machine translation of text will typically perform simple substitution of printed words in one language for words in another. More sophisticated text translation systems use corpus and statistical techniques for improved recognition of whole phrases. Speech translation, on the other hand, is more complex than text translation and often involves a human translator to perform a human translation or a machine-aided human translation.

SUMMARY

The illustrative embodiments provide for automatic synthesis of translated speech using speaker-specific phonemes. An embodiment includes converting, by a processor, an original audio signal to an original text string, wherein the original audio signal is from a recording of the original text string being spoken by a specific person, and wherein the original text string includes a word in a source language. The embodiment also includes generating, by the processor, a translated text string by translating the original text string from the source language to a target language, wherein the translated text string includes, as a translated word, a translation of the word from the source language to a target language. The embodiment also includes assembling, by the processor, a standard phoneme sequence from a set of standard phonemes, wherein the standard phoneme sequence includes a standard pronunciation of the translated word. The embodiment also includes associating, by the processor, a custom phoneme with a standard phoneme of the standard phoneme sequence, wherein the custom phoneme includes the specific person's pronunciation of a sound in the translated word. The embodiment also includes synthesizing, by the processor, the translated text string to a translated audio signal that includes the translated word pronounced using the custom phoneme. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a block diagram of an example CPDS data structure in accordance with an illustrative embodiment;

DETAILED DESCRIPTION

Figure 1:
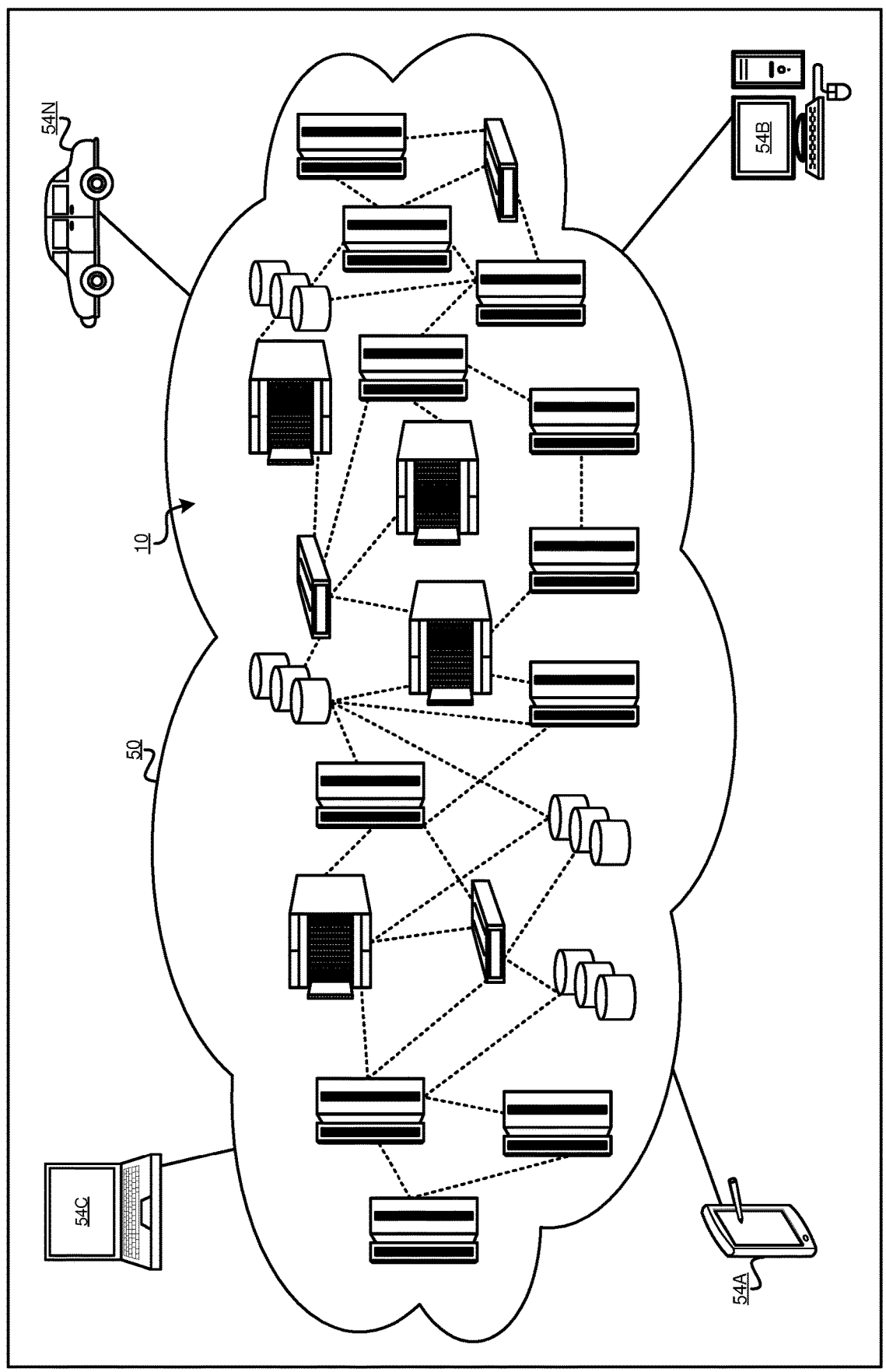
FIG. 1 depicts a cloud computing environment according to an embodiment of the present invention.

Advances in computer technology over the past several decades, coupled with today's wide-spread accessibility of the Internet, have led to an era of unprecedented global connectedness. Recent statistics indicate that more than 4 billion people now have some form of access to the Internet, which represents more than half of the world's population. There are now Internet users from more than 200 different countries and websites posted in more than 300 different languages.

Despite language differences, many websites in various languages can be readily understood by other users who speak various other languages. This has been made possible by innovations that allow for text-based web content to be translated quickly and easily using machine translation technology. For example, applications exist that allow a user to request a translated version of a web page to a language selected by a user.

However, a technical problem with such translation solutions is that they operate by word for word or phrase for phrase replacement that replaces a word or phrase in a source language with a word or phrase in a target language. As a result, such applications translate only the text-based portions of a web page. As Internet infrastructure continues to improve, the proportion of web content that is media-based content, such as audio and video content. Media-based content includes, for example, sequential data that has sequentially matched multimedia content, that includes segments of audio content sequentially matched to segments of video content.

Existing solutions for translating text-based web content are not capable of translating such media content. This leaves few options for users seeking a translation of media content, and such solutions typically involve some amount of human translation, which can be expensive and involves some delay, making such options impractical for users seeking to engage with live content, such as web-based meetings or conferences.

This problem also exists in other areas of technology, such as audio-visual streams observed by a viewer as television programs broadcast in the language native to the country of broadcast. Moreover, an audio-visual stream may originate from DVD, video, or any other appropriate source, and may consist of video, speech, music, sound effects and other contents. An audio-visual device can be, for example, a television set, a DVD player, or a multimedia system. In the case of foreign-language films, subtitles—also known as open captions—can be integrated into the audio-visual stream by keying the captions into the video frames prior to broadcast.

It is also possible to perform voice-dubbing on foreign-language films to the native language in a dubbing studio before broadcasting the television program. Here, the original screenplay is first translated into the target language, and the translated text is then read by a professional speaker or voice talent. The new speech content is then synchronized into the audio-visual stream. In Europe, videos are usually available in one language only, either in the original first language or dubbed into a second language. Videos for the European market are relatively seldom supplied with open captions. DVDs are commonly available with a second language accompanying the original speech content, and are occasionally available with more than two languages. The viewer can switch between languages as desired and may also have the option of displaying subtitles in one or more of the languages.

Dubbing with professional voice talent has the disadvantage of being limited, owing to the expense involved, to a few majority languages. Because of the effort and expense involved, only a relatively small proportion of all programs can be dubbed. Programs such as news coverage, talk shows or live broadcasts are usually not dubbed at all. Captioning is also limited to the more popular languages with a large target audience such as English, and to languages that use the Roman font. Languages like Chinese, Japanese, Arabic and Russian use different fonts and cannot easily be presented in the form of captions. This means that viewers whose native language is other than the broadcast language have a very limited choice of programs in their own language. Other native-language viewers wishing to augment their foreign-language studies by watching and listening to audio-visual programs are also limited in their choice of viewing material.

The illustrative embodiments address these technical shortcomings by providing a customized dubbing feature that provides real time or near real time machine translation of media content. Disclosed embodiments extract text from media streams or files, for example using natural language processing (NLP), translate the extracted text to a second language, and use text to speech processing to synthesize an audio stream translated to a language different from that of the original media file. In some embodiments, this processing is performed in parallel to generate multiple translations in parallel for users desiring translations in different languages.

The illustrative embodiments further recognize that many programs feature well-known performers having well-known voices. Many performers have voices that sound easy-on-the-ear, natural, and have an ability to read and produce vocal characteristics that suit the production conveyed by the media content. Such performers constitute a group of professional voice performers for whom efficient vocal function and good vocal quality are integral to other elements of the media content. Thus, illustrative embodiments recognize that prior translation solutions that replace the original performer's voice with that of a translator or computer-generated voice takes away from the media experience in some cases.

The illustrative embodiments address these technical shortcomings by providing a customized dubbing feature that provides real time or near real time machine translation of media content that is presented with synthesized audio that includes phonemes from the original performer's voice pronouncing some or all of the sounds for the second language. Disclosed embodiments identify, extract, and use vocalic attributes of an original performer (actor/actress) in the first language in a given audio/video file. In some embodiments, the performer's phoneme pronunciation in the first language is mapped to similar phoneme pronunciations in the secondary language. In some embodiments, the audio of a film is translated to multiple languages in real time or near real time using the original performer's voice for some or all of the translated audio.

In some embodiments, media translation may be performed to generate multiple simultaneous different translations in real time or near real time. In addition, voice attributes of the original performers may be can be identified and extracted and preserved in the translated versions of the audio. In some embodiments, an International Phonetic Alphabet (IPA) is used that clearly and unambiguously indicates how a word or name actually sounds with one letter for each sound. It has been widely used to annotate word sounds in other languages for English-speakers. In some embodiments, this information is leveraged to map the performer's phoneme taken from a recording of a different word to a sound included in a translated word or phrase. Such features allow the voice of the original performer to be at least partially reproduced, thereby reproducing elements of the media experience owed to the performer's voice talents.

Disclosed embodiments enable the screening of audiovisual material to a mass audience in countries where viewers do not speak the same language as the performers in the original production. Media files discussed herein may include films, videos, and sometimes video games.

In an illustrative embodiment, a process for Customized Para-Dubbing Synthesis (CPDS) provides customized machine translation that extracts and uses vocalic attributes of an original performer (actor/actress) in a given file, and then dubs the audio of a given film to multiple languages in real time or near real time. In some embodiments, the process defines a data structure for saving and tracking customized machine translations.

As a non-limiting example, in some embodiments, a data structure includes fields such as a Video File ID, Performer ID, Script ID, Emotional State, Voice ID, First Language, Original Audio, Original Text, Secondary Language, Translated Text, Synthesized Audio, Started Time Stamp, background noise/effects, Ended Time Stamp. In this example embodiment, the fields are defined as follows:

Video File ID is a unique identifier for identifying a particular segment of the original media file;

Performer ID is a unique identifier for identifying the speaker in the particular segment of the original media file indicated by the Video File ID;

Script ID is a unique identifier for identifying the script read by the performer indicated by the Performer ID;

Emotional State identifies an emotion expressed by the performer in the video file indicated by the Video File ID;

Voice ID combines the performer indicated by the Performer ID with the emotion expressed by the performer according to the Emotional State;

First Language indicates the source language of the particular segment of the original media file indicated by the Video File ID;

Original Audio and Original Text indicate the word spoken and corresponding text in the particular segment of the original media file indicated by the Video File ID;

Secondary Language indicates the target language to which the audio of the particular segment of the original media file indicated by the Video File ID is to be translated;

Translated Text indicates the translation to the language indicated by the Secondary Language of the word spoken and corresponding text in the particular segment of the original media file indicated by the Video File ID;

Synthesized Audio indicates the phonetic pronunciation of the translated text indicated in the Translated Text;

Background Noise/Effects indicates sounds that accompany the speech in the media file that is being translated; and Started Time Stamp and Ended Time Stamp provide start and finish times for the particular video segment of the original media file indicated by the Video File ID.

In some embodiments, the process defines normalized crossing language phoneme mapping tables for each pair of languages (source and target languages) according a translation service list. In some such embodiments, the process scans a given video/audio file and attempts to identify performers and performers speech. For example, in some embodiments, the process generates a voice print from the audio in the media file, then uses that voice print as a query voice print to search a repository of voice prints for one that matches the query voice print. In some embodiments, the stored voice prints are associated with respective performers, so if the search locates a matching voice print, the process identifies the performer associated with the matching stored voice print as the performer speaking in the media file. In some embodiments, the process then associates the identified performer with a media file in a repository that has recorded samples of the performer's voice.

In some embodiments, the process converts the identified speech into text, for example into text subtitles. In some such embodiments, the process indexes the converted subtitle texts associated with the identified performers so as to be associated with the Voice ID of the recording from the original audio file. In some such embodiments, the process translates each indexed segment of the text associated with each identified performer, resulting in a translated text file in the target language. In some embodiments, the process extracts each identified performer's vocalic characteristics. In some such embodiments, the process determines if vocalic data for the speaker is available. For example, in an embodiment, the process queries a database storing a repository of sample audio, such as recorded audio of performers, including a plurality of phonemes for each performer. If vocalic data for the speaker is found, the process extracts the vocalic data associated with the speaker.

In an embodiment, the process receives the custom phonemes of the speaker from a database and maps the speaker's source-language phenomes to standard phonemes of a target language. For example, in an embodiment, the process attempts to associate each custom phoneme with a standard phoneme of a standard phoneme sequence of the target language by associating the speaker's phoneme pronunciation in the source language to standard phonemes in the target language. Next, the process synthesizes audio in the target language that was translated from the source language. In an embodiment, the process uses the speaker's mapped phoneme audio as part of the synthesized audio. In some embodiments, the process then provides the synthesized audio to a dubbing player, media player, or other audio output device to output the synthesized speech.

For instance, a performer Peter says "CAT" (Upper case means audio word in here) in audio in English. Then the process needs to interpret it to Russian with Peter's vocalic characteristics to "КОШКА" (Upper case means audio word) in audio in Russian. In an embodiment, the process recognizes "CAT" in audio and converts it to text word "cat" (Lower Case means text word). Next, in some embodiments, the process translates it to the Russian text word Кошка. Next, in some embodiments, the process retrieves standard phonemes of "К", "О", "Ш", "К", "A" in the correlated pronunciation in English words: (К, as in "looK"); (O, as in "fOrt"); (Ш, as the SH in "SHut"); (К, as in "looK"); and (A, as in "cAr"). Next, in some embodiments, the process finds the customized Peter phonemes of Peter speaking (К, as in "looK"); (O, as in "fOrt"); (Ш, as the SH in "SHut"); (К, as in "looK"); and (A, as in "cAr"). Here, the standard phonemes may differ from the customized Peter phonemes, for example the standard phoneme of the vowel A in "CAR" may be /kɑː/, but the customized Peter phoneme of the vowel A in "CAR" for Peter may be /kɑi/ (or /kæ/, or /kʌ/ or others). In an embodiment, the process eventually synthesizes customized Russian "КОШКА" based on Peter's customized phonemes as "KOSHUKAR" instead of "KOSHUKA."

A virtualized data processing environment is often referred to as a "cloud" that provides computing resources and computing services to several clients on an as-needed basis. Cloud computing services are available in a typical virtualized data processing environment according to different models, including Infrastructure as a Service (IaaS), Platform as a Service (PaaS), Software as a Service (SaaS), and Function as a Service (FaaS). These services are made available to an international customer base that continues to expand as global networking capabilities and infrastructure continues to improve.

A commonly used method of virtualization is container-based virtualization. Container-based virtualization, also called operating system virtualization, is an approach to virtualization in which a virtualization layer runs as an application within the operating system. A layer is a software package that participates in an image. An image is a binary package that can be installed on a hardware to instantiate a VM on the hardware. An image can include any number of software packages, whose layers are assembled together in the image as a monolithic binary. A single image can, but need not necessarily, represent an application.

In container-based virtualization, the operating system's kernel runs on a hardware node with several isolated application environments installed on top of it. The isolated application environments are called containers. In other words, a container is a running instance of an image of a VM in which the layers are distinguishable from one another. Container-based virtualization is a way to operate several VMs on the same host, where the VMs share the same kernel and memory space among themselves and with the host. The isolation between the containers occurs at multiple resources, such as at the file-system, the network stack subsystem, and one or more namespaces, but not limited thereto. By sharing the same running kernel and memory space there is virtually no difference between the performance of the "host" operating system and the containers.

Generally, a container is an image formed using a set of one or more layers. The layers typically include a layer for modifying the operating system to a specific version or specific customization, such as localization of the operating system. Localization allows the operating system (and other aspects of a computing service) to be customized for customers in different parts of the world. For example, the operating system can be adapted to various languages and regions without engineering changes. Localization is used to translate content such as user interface elements and documentation based on locale. Localization may also include other relevant changes to content such as display of numbers, dates, currency, and so on, based on locale.

On a typical computing platform, a "locale" is the part of a user's environment that brings together information about how to handle data that is specific to the user's particular region, language, or territory. Many operating systems and applications may be adapted to conform to a variety of regional preferences through the use of "locales" that designate the manner by which they perform processing on data, both with regard to inputs and outputs. These regional preferences are more than just a convenience for users. Without localization, the inability to properly set some regional preferences can lead to errors. For example, users may experience errors if the date formatting or monetary settings are different than expected. Also, localization prevents language barriers that would otherwise unnecessarily exclude some users from being able to use such systems and services.

The locale is typically part of the operating system. The locale used by an operating system is typically represented as an object file that is used to identify a set of cultural conventions. Examples of these cultural conventions include information on collation, character classification, date/time format, monetary symbols, and numeric representations. Applications executing on the computing platform use the locale to determine various location- or language-related default values. The locale is important for both applications and the platform on which the applications are running. For example, the platform may use the locale to determine a default language, a time zone, and a date format.

It is not uncommon for a user to find that the user's language or region does not coincide with any of the locales installed on an operating system. Operating systems typically include a default set of pre-installed default locales. However, the default locales may only include a small percentage of all available locales. For example, an operating system may include ten or fewer pre-installed default locales, while there may be hundreds of other locales available for the operating system that are not pre-installed.

In the situation where a user does not find their needed locale installed, the user must manually install the locale. Depending on the experience level of the user, the process of trying to manually install a locale can be difficult or inconvenient for several reasons. For example, an inexperienced user may be unaware of the ability to install a different locale, may be unfamiliar with the process of installing a locale, or may not be familiar with where additional locales can be found. Even an experienced user may encounter obstacles, for example the user may lack the necessary system permissions to install a locale. These problems can be difficult for a user to overcome, particularly since the user may be working with the operating system set up for an unfamiliar language while trying to resolve these issues.

One proposed solution is to pre-install all available locales. However, an operating system may have hundreds of locales available, which would consume more memory than desired. This is particularly true for cloud computing services where it is desirable to minimize the installation footprint of the operating system for performance purposes.

Thus, using today's technology, when a user finds that an operating system installed on a cloud service lacks their preferred or needed locale, the user's only option is to try to work through the process of manually finding and installing the locale. This manual process lacks the convenience and accessibility needed to provide cloud computing services to an international customer base that continues to expand as global networking capabilities and infrastructure continues to improve.

The illustrated embodiments address these issues by detecting a demand for a locale in a computing environment and automatically adding the locale to an installation list. In some embodiments, once the locale is on the installation list, the locale will automatically be installed each time a user or group of users launches an application in the computing environment, thus obviating the need for the user or group of users to manually install the locale.

An embodiment can be implemented as a combination of certain hardware components and a software application. An implementation of an embodiment, or one or more components thereof, can be configured as a modification of an existing controller (e.g., an existing SDN controller), a modification of an existing container manager, with a companion software application executing in some combination of (i) the controller or manager itself, (ii) a data processing system communicating with the controller or manager over short-range radio or a local area network (LAN), and (iii) a data processing system communicating with the controller or manager over a wide area network (WAN).

Generally, an embodiment can be configured to establish a demand threshold for adding a locale to an installation list according to selection data associated with user inputs. In some embodiments, a graphical user interface (GUI) provides the user with form elements that a user can populate or manipulate in order to input criteria for adding a locale to an installation list. Some such embodiments can be configured to generate the selection data based on the user-selected criteria. Non-limiting examples of criteria may include a minimum number of requests to install a locale (e.g., the locale installation must be requested at least five times), a specified window of time during which the minimum number of requests must be received (e.g., the locale installation must be requested at least three times in a six hour period), or the requests to install the locale must come from a specified group of users (e.g., the locale installation must be requested at least five times from users in a specified group).

An embodiment monitors user inputs to a cloud computing environment so as to detect user inputs that include requests to install a locale. In some embodiments, the monitoring of user inputs is conducted during a time period specified by the selection data. Embodiments can be configured to monitor user inputs in a variety of different ways. As a non-limiting example, in a cloud computing environment, monitoring is performed by nodes that provide monitoring results to a backend server. As another non-limiting example, in a cloud computing environment, monitoring is performed by a backend server that monitors user inputs by monitoring an application programming interface (API). In some embodiments, a backend server monitors user inputs in real time or in near real time.

An embodiment can be configured to dynamically update a demand score associated with the locale based on ongoing detection of locale installation requests during the monitoring of user inputs. In some embodiments, the demand score is reduced upon detecting that no request to install the locale has been detected for a specified period of time. For example, a criteria may require n requests to install a locale in m hours, and such embodiments may employ a sliding time window of m hours that reduces the demand score as detected requests age beyond m hours. In some embodiments, the selection data specifies a group of users, so the demand score is only updated when a detected of locale installation request is from a user in the specified group.

Some embodiments are configured such that the updating of the demand score involves weighing installation requests from some users or groups more than others. For example, some embodiments increase the demand score by a greater amount when the request is from a root user or a VIP user. Some such embodiments include detecting a user characteristic, such as whether the user is root or has a VIP account or status, and weighs requests from such users more than other users for purposes of calculating the demand score.

Some embodiments automatically add the locale to the installation list upon detecting that the demand score satisfied the demand threshold. In some embodiments, installation list is a list of locales that are automatically installed when applications, for example in the form of container instances, are launched. In some embodiments, before the locale is added to the installation list, the embodiment detects that the demand score satisfied the demand threshold, and verifies that the locale is not already on the installation list and or on a default locale list.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
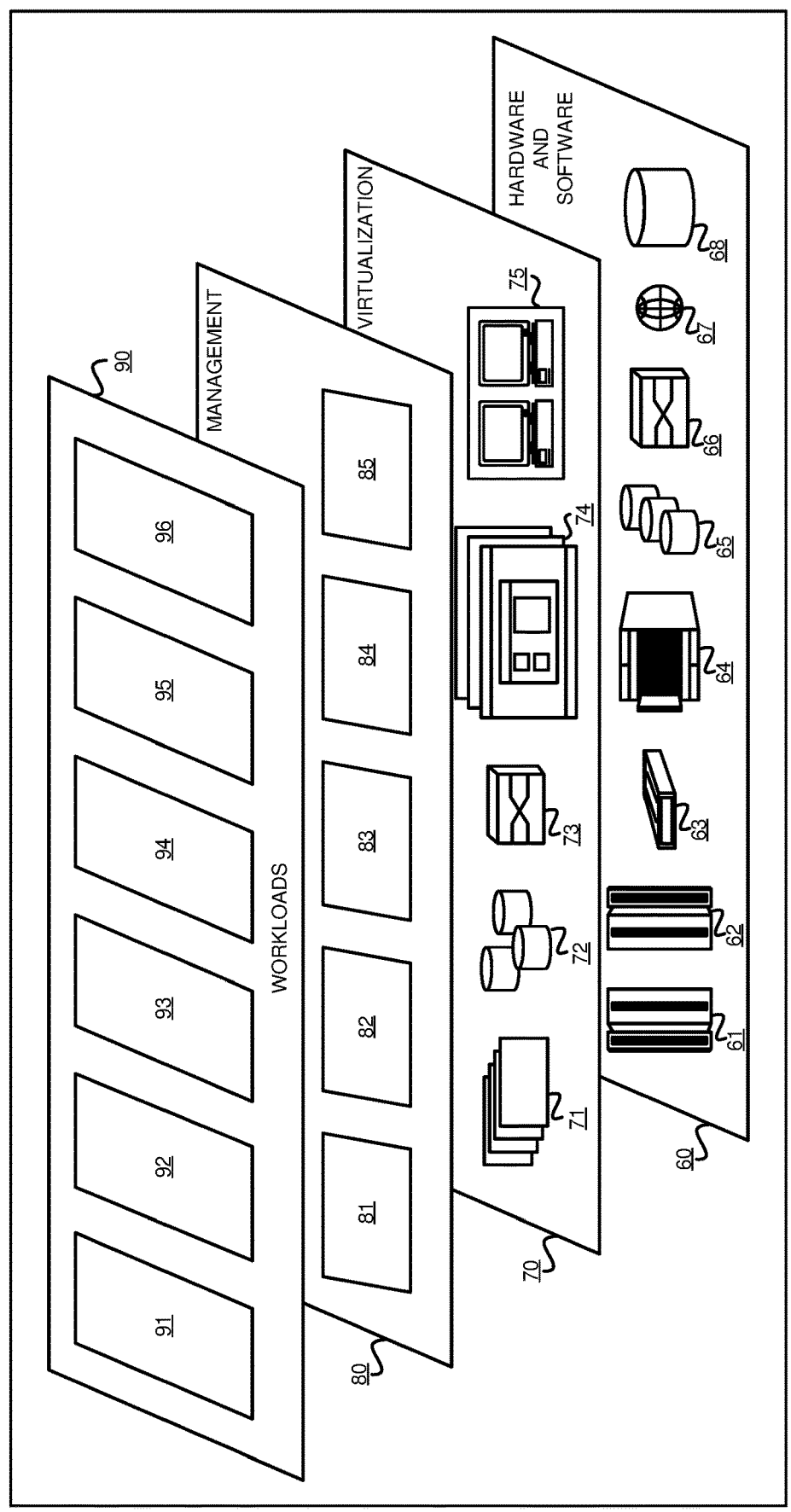
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and translated speech synthesis processing 96.

Figure 3:
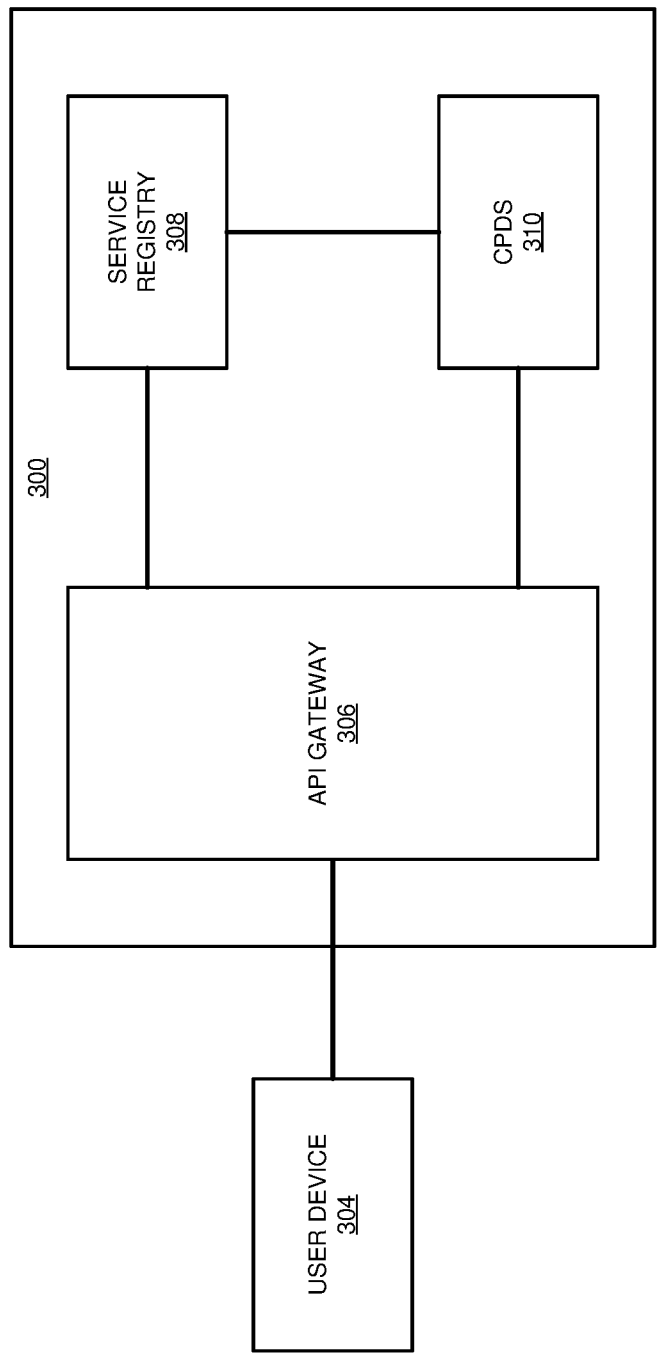
FIG. 3 depicts a block diagram of an example service infrastructure that includes a CPDS system in accordance with an illustrative embodiment.

With reference to FIG. 3, this figure depicts a block diagram of an example service infrastructure 300 that includes a CPDS system 310 in accordance with an illustrative embodiment. In some embodiments, the CPDS system 310 is deployed in workloads layer 90 of FIG. 2. By way of example, in some embodiments, CPDS system 310 is implemented as translated speech synthesis processing 96 in FIG. 2.

In the illustrated embodiment, the service infrastructure 300 provides services and service instances to a user device 304. User device 304 communicates with service infrastructure 300 via an API gateway 306. In various embodiments, service infrastructure 300 and its associated CPDS 310 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 304 connects with API gateway 306 via any suitable network or combination of networks such as the Internet, etc. and use any suitable communication protocols such as Wi-Fi, Bluetooth, etc. Service infrastructure 300 may be built on the basis of cloud computing. API gateway 306 provides access to client applications like CPDS 310. API gateway 306 receives service requests issued by client applications, and creates service lookup requests based on service requests.

In the illustrated embodiment, service infrastructure 300 includes a service registry 308. In some embodiments, service registry 308 looks up service instances of CPDS 310 in response to a service lookup request such as one from API gateway 306 in response to a service request from user device 304. For example, in some embodiments, the service registry 308 looks up service instances of CPDS 310 in response to requests related to dubbing and machine translation from the user device 304.

In some embodiments, the service infrastructure 300 includes one or more instances of the CPDS 310. In some such embodiments, each of the multiple instances of the CPDS 310 run independently on multiple computing systems. In some such embodiments, CPDS 310, as well as other service instances of CPDS 310, are registered in service registry 308.

In some embodiments, service registry 308 maintains information about the status or health of each service instance including performance information associated each of the service instances. For example, as described in more detail herein, such performance information may include various types of performance characteristics of a given service instance (e.g., cache metrics, etc.). As described in more detail herein, extended service registry 308 ranks service instances based on their respective performance characteristics, and selects top-ranking service instances for service discovery or service lookup requests. In the event that a service instance becomes unresponsive or, unhealthy, the service registry will no longer provide its address or information about this service instance to other services.

Figure 4:
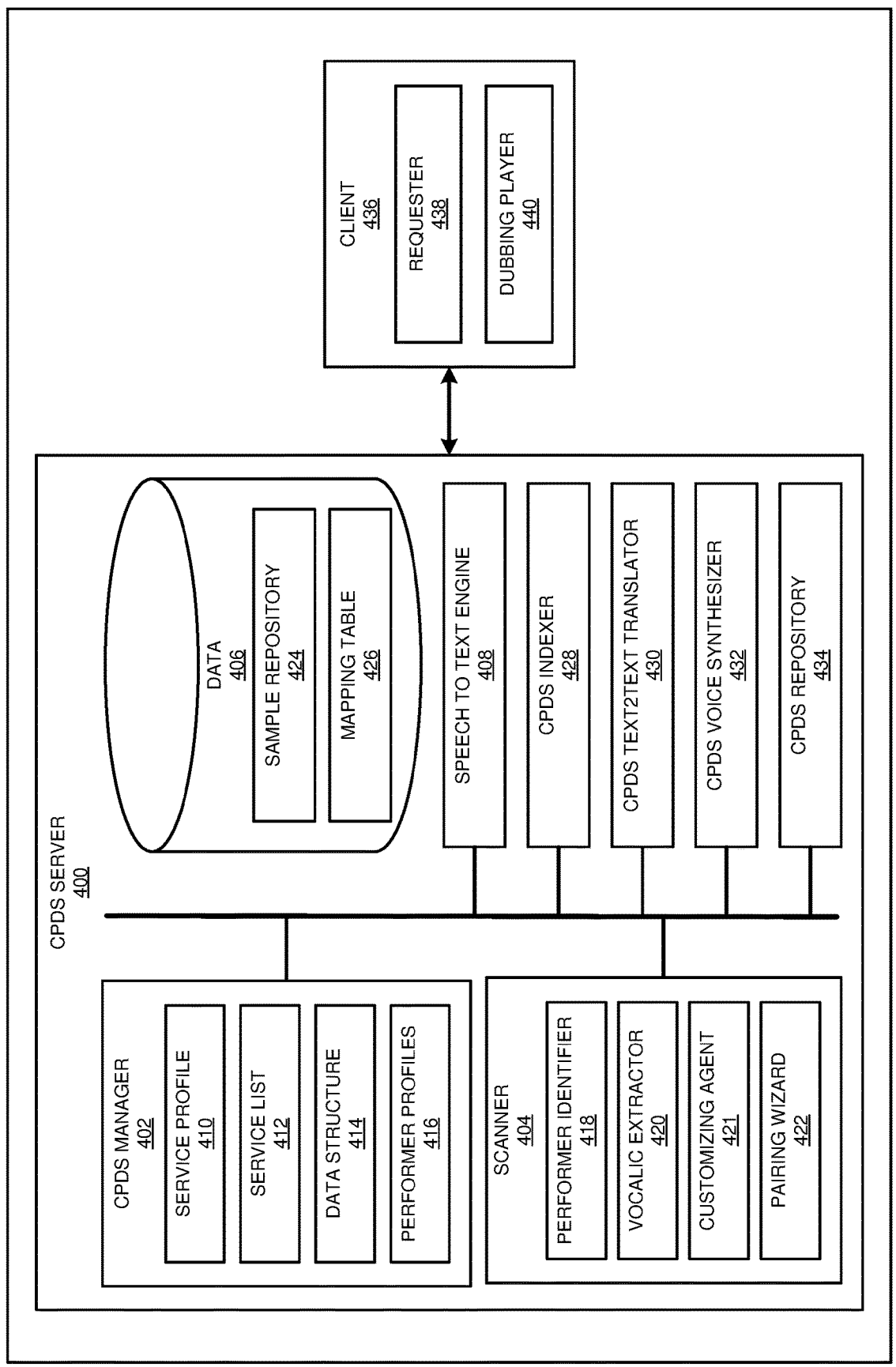
FIG. 4 depicts a block diagram of an example CPDS server 400 in accordance with an illustrative embodiment.

With reference to FIG. 4, this figure depicts a block diagram of an example CPDS server 400 in accordance with an illustrative embodiment. In a particular embodiment, CPDS server 400 is an example of CPDS 310 of FIG. 3.

In the illustrated embodiment, CPDS server 400 includes a CPDS manager 402, a scanner 404, a memory 406 for storing data, a speech to text engine 408, a CPDS indexer 428, a CPDS text2text translator 430, a CPDS voice synthesizer 432, and a CPDS repository 434. In the illustrated embodiment, the CPDS manager 402 includes a service profile 410, a service list 412, a data structure 414, and performer profiles 416. In the illustrated embodiment, the scanner 404 includes a performer identifier 418, a vocalic extractor 420, a customizing agent 421, and a pairing wizard 422. In the illustrated embodiment, the memory 406 includes a sample repository 424 and a mapping table 426. In alternative embodiments, the CPDS server 400 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the CPDS server 400 communicates with a client device 436. In the illustrated embodiment, the client device 436 includes a requester 438 and a dubbing player 440.

In the illustrated embodiment, CPDS manager 402 serves as a module for defining, storing and managing the service profile 410, service list 412, data structure 414, and performer profiles 416 to make sure the correct process is performed according to a user request received from the requester 438 of the client device 436. In some embodiments, the service profile 410 is a configuration file for the CPDS service provided by the CPDS server 400. In some embodiments, the service profile 410 specifies supporting processes that standardize documentation and capability metadata associated with the CPDS service. In some embodiments, the CPDS data structure 414 refers to a module for defining a data structure for saving and tracking personalized media, such as audio/video files. As a non-limiting example, a data structure includes fields such as Video File ID, Performer ID, Script ID, Emotional State, Voice ID, First Language, Original Audio, Original Text, Secondary Language, Translated Text, Synthesized Audio, Started Time Stamp, and Ended Time Stamp. In some embodiments, the service list 412 includes a list of translation capabilities of the CPDS service, including a list of language pairs that can be the source and target languages of the CPDS service. In some embodiments, the CPDS performer profiles 416 include a set of configuration files and parameter data sets associated with performers. Performers, as referred to herein, are people who have had their voice recorded and the recording has been, or is being, processed by the CPDS server 400.

In the illustrated embodiment, the sample repository 424 is a database of performer voice samples. In some embodiments, the sample repository 424 stores a plurality of audio files of respective phonemes for each performer identified by the CPDS server 400. In some embodiments, the sample repository 424 associates each a unique identifier with each performer, and associates each audio file of the performer with the performer's unique identifier.

In the illustrated embodiment, the mapping table 426 is a module for defining a normalized crossing language phoneme mapping table for each language pair listed in the service list 412. In some embodiments, the service list 412 is used for mapping a performer's phoneme pronunciation in a first language (source language) to a standard phoneme pronunciation that is correlated to a second language (target language).

Figure 5:
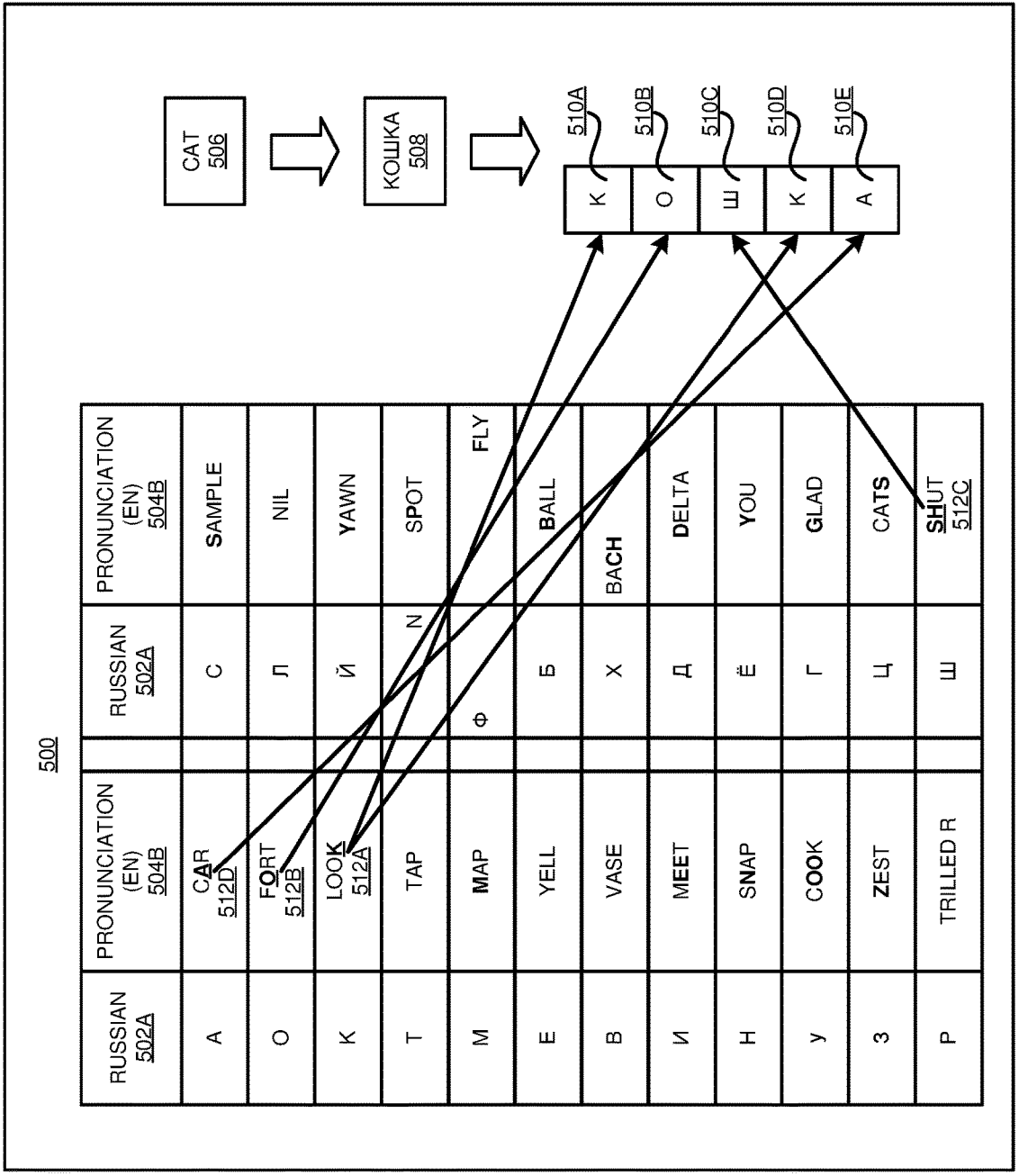
FIG. 5 depicts a normalized phoneme mapping table in accordance with an illustrative embodiment.

For example, FIG. 5 shows an embodiment of a normalized Russian-English Phoneme mapping table 500. In the illustrated embodiment, the mapping table 500 shows how phonemes used when pronouncing certain Russian letters match with phonemes used when pronouncing certain English letters. For example, the mapping table 500 equates the pronunciation of "A" (Cyrillic capital letter A) in Russian to the pronunciation of "A" (Latin capital letter A) when saying the word "car" in English.

Referring again to FIG. 4, the scanner 404 is a module for scanning a given media file, which may be, for example, an audio or video file. In some embodiments, the scanner 404 associates a video file ID to the media file and associates the video file ID with the media file. In the illustrated embodiment, the scanner 404 uses one or more of the performer identifier 418, the vocalic extractor 420, customizing agent 421, and the pairing wizard 422. The performer identifier 418 is a module for identifying the performer or performers speaking in the media file. For example, in some embodiments, the performer identifier 418 generates a voice print from the audio in the media file, then uses that voice print as a query voice print to search a repository of voice prints for one that matches the query voice print. In some embodiments, the stored voice prints are associated with respective performers, so if the search locates a matching voice print, the performer identifier 418 identifies the performer associated with the matching stored voice print as the performer speaking in the media file. In some embodiments, the performer identifier 418 then associates the identified performer with the media file.

In some embodiments, the vocalic extractor 420 is a module that receives a list of one or more performers identified by the performer identifier 418 and extracts vocalic characteristics from sample repository 424. In some embodiments, the vocalic characteristics include custom phonemes stored as recordings of the performer's vocalic phonemes, which include vowel sounds spoken by the identified performer. In some embodiments, the customizing agent 421 maps the performer's phoneme pronunciation in the first language (source language) to a standard phoneme pronunciation according a cross-language phoneme mapping from the source language to the target language.

In some embodiments, the pairing wizard 422 receives the custom phonemes of the identified performer from the vocalic extractor 420. The pairing wizard 422 then attempts to associate each custom phoneme with a standard phoneme of a standard phoneme sequence of the target language.

For example, as shown in FIG. 5, the pairing wizard 422 associates the identified performer's phoneme pronunciation in the source language (English in the illustrated example) to standard phonemes in the target language (Russian in the illustrated example). In the illustrated example, the CPDS server 400 is translating English "CAT" in audio to Russian "К О ШК А" in audio, which is pronounced KOSHKA. The pairing wizard 422 isolates the phonemes needed to synthesize "К О ШК А," resulting in K (as in "looK"), O (as in "fOrt"), SH (as in "SHut"), K (as in "looK"), and A (as in "cAr") (where the upper case letter indicates the vowel or consonant being pronounced) according to performer's vocalic characters on the correlated phonemes.

Referring again to FIG. 4, the speech to text engine 408 receives the media file and performs a speech to text process to create a text transcript of the audio. In some embodiments, the text engine 408 uses natural language processing (NLP) and machine learning to recognize the speech in the audio of the media file and output the corresponding text. In some embodiments, the speech to text engine 408 receives a video file ID from the CPDS manager 402 that is associated with the media file. In some such embodiments, the speech to text engine 408 engine associates the video file ID with the text file that it generates from the audio in the media file.

In some embodiments, the CPDS indexer 428 is a module that indexes the converted text file to be associated with the identified performer provided by the performer identifier 418. In some embodiments, the text2text translator 430 receives the indexed text file containing text in the source language spoken by the performer. The text2text translator 430 then converts the text to translated text in the target language. For example, if the said the audio word "CAT" in the media file, the text engine 408 creates a text file with the word "cat" in plain text, and then text2text translator 430 creates a new text file with the Russian translation of cat (" К о Ш К а") in plain text. In some embodiments, the text2text translator 430 uses NLP and machine learning to generate the translated text in the target language from the original text in the source language. In some embodiments, the CPDS voice synthesizer 432 synthesizes the translated text output from the text2text translator 430 to speech in the target language. In some embodiments, the CPDS voice synthesizer 432 uses the custom phonemes output from the pairing wizard 422, which includes recorded audio of the performer for each individual phoneme that is available for that performer in the sample repository 424. In such embodiments, the CPDS voice synthesizer 432 synthesizes the translated text to a translated audio signal that includes the translated word pronounced using the custom phonemes in the performer's voice.

In some embodiments, the CPDS repository 434 stores the synthesized audio for future use and for retrieval by the client 436. In some embodiments, the CPDS repository 434 sends a push notification to the client 436 to alert the client 436 as to the availability of the translated audio. In some embodiments, the client 436 includes an audio player or dubbing player 440. In some such embodiments, the dubbing player 440 is a module for playing the synthesized audio generated by the CPDS voice synthesizer 432, for example for presenting it to an audience. In some embodiments, the dubbing player 440 receives the synthesized audio directly from the CPDS voice synthesizer 432 as it is generated. In some embodiments, the dubbing player 440 receives push notifications from the CPDS voice synthesizer 432 when the synthesized audio is ready and, in response, the dubbing player 440 retrieves the synthesized audio.

With reference to FIG. 6, this figure depicts a block diagram of an example CPDS data structure 600 in accordance with an illustrative embodiment. In a particular embodiment, CPDS data structure 600 is an example of CPDS data structure 414 of FIG. 4.

In the illustrated embodiment, the CPDS data structure 600 includes example records for five different translations of a single video file ID F0011. Each of the example records includes English (EN) as the source language, but respective different target languages Chinese, simplified script (ZH-HANS), Russian (RU), German (DE), Spanish (ES), and Japanese (JA) as indicated in the Secondary Language field 618 for each record. Each of the example records includes an example Video File ID 602, Performer ID 604, Script ID 606, Emotional State 608, Voice ID 610, First Language 612, Original Audio 614, Original Text 616, Secondary Language 618, Translated Text 620, Synthesized Audio 622, Started Time Stamp 624, and Ended Time Stamp 626.

The Video File ID 602 is a unique identifier for identifying a particular segment of the original media file. The Performer ID 604 is a unique identifier for identifying the speaker in the particular segment of the original media file indicated by the Video File ID 602. The Script ID 606 is a unique identifier for identifying the script read by the performer indicated by the Performer ID 604. The Emotional State 608 identifies an emotion expressed by the performer in the video file indicated by the Video File ID 602. The Voice ID 610 combines the performer indicated by the Performer ID 604 with the emotion expressed by the performer according to the Emotional State 608. The First Language 612 indicates the source language of the particular segment of the original media file indicated by the Video File ID 602. The Original Audio 614 and Original Text 616 indicates the word spoken and corresponding text in the particular segment of the original media file indicated by the Video File ID 602. The Secondary Language 618 indicates the target language to which the audio of the particular segment of the original media file indicated by the Video File ID 602 is to be translated. The Translated Text 620 indicates the translation to the language indicated by the Secondary Language 618 of the word spoken and corresponding text in the particular segment of the original media file indicated by the Video File ID 602. The Synthesized Audio 622 indicates the phonetic pronunciation of the translated text indicated in the Translated Text 620. Started Time Stamp 624 and Ended Time Stamp 626 provide start and finish times for the particular video segment of the original media file indicated by the Video File ID 602.

Referring again to FIG. 4, the scanner 404 includes the Video File ID 602 with the particular video segment of the original media file when sending the video segment to the performer identifier 418. The performer identifier 418 then adds the Performer ID 604, Script ID 606, and Voice ID 610, and sends this information to the vocalic extractor 420 and the speech to text engine 408. The speech to text engine 408 converts the speech to text, which becomes the Original Text 616, and may use the Script ID 606, which may be assigned by the speech to text engine 408, the scanner 404, or the CPDS manager 402. The CPDS indexer 428 uses the Performer ID 604, Voice ID 610, and Original Text 616 to index the converted text associated with the identified performer. The text2text translator 430 uses the Original Text 616 to generate the Translated Text 620. The vocalic extractor 420 uses the Voice ID 610 and the Original Audio 614 to extract each identified performer's vocalic characteristics. The CPDS voice synthesizer 432 generates the Synthesized Audio 622, which is provided to the dubbing player 440 to play the audio.

Figure 7:
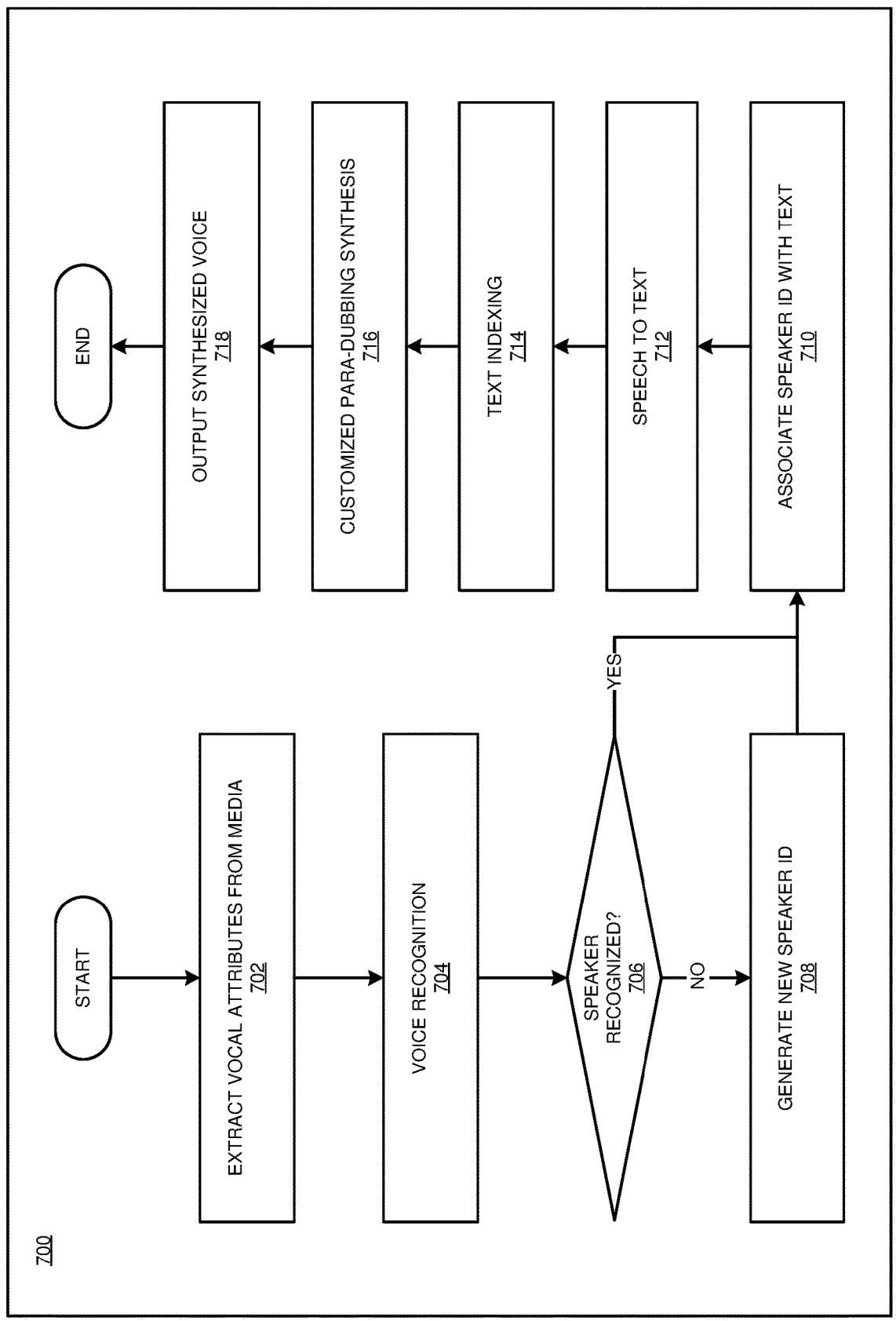
FIG. 7 depicts a flowchart of an example process for automatic synthesis of translated speech using speaker-specific phonemes in accordance with an illustrative embodiment.

With reference to FIG. 7, this figure depicts a flowchart of an example process 700 for automatic synthesis of translated speech using speaker-specific phonemes in accordance with an illustrative embodiment. In some embodiments, the process 700 is performed by a CPDS server deployed in a cloud computing environment, for example CPDS server 400 in cloud computing environment service infrastructure 300 of FIG. 3.

In an embodiment, at block 702, the process extracts vocal attributes from media. For example, in some embodiments, at block 702 the process extracts vocal audio components of a media file that may include video, background noise, and other media elements that are needed for the vocal translation process. Next, at block 704, the process performs a voice recognition process to attempt to recognize the speaker. For example, in some embodiments, the process generates a voice print from the audio in the media file, then uses that voice print as a query voice print to search a repository of voice prints for one that matches the query voice print. In some embodiments, the stored voice prints are associated with respective performers, so, at block 706, if the search locates a matching voice print, the stored performer identifier identifies the performer associated with the matching stored voice print as the performer speaking in the media file and, at block 710, associates the identified performer with the media file. Otherwise, at block 708, the process considers the speaker to be a new speaker, so it generates a new speaker ID and, at block 710, associates the new speaker ID with the media file.

In an embodiment, at block 712, the process performs a speech to text process. For example, in some embodiments, the process performs a speech to text process to create a text transcript of the audio. In some embodiments, the process uses natural language processing (NLP) and machine learning to recognize the speech in the audio of the media file and output the corresponding text.

In an embodiment, at block 714, the process performs text indexing. For example, in some embodiments, the process indexes the converted text file to be associated with the identified performer. In some embodiments, at block 716, the process performs a customized para-dubbing synthesis process that uses the indexed text and generates translated audio that includes one or more audio segments recorded by identified speaker as phonemes for constructing the synthesized translation audio output. For example, in some embodiments, the process assembles a standard phoneme sequence from a set of standard phonemes, where the standard phoneme sequence includes a standard pronunciation of the translated word, and associates a custom phoneme with a standard phoneme of the standard phoneme sequence, where the custom phoneme includes the performer's pronunciation of a sound in the translated word. Then, at block 718, the process outputs synthesized voice speaking the translated audio.

Figure 8:
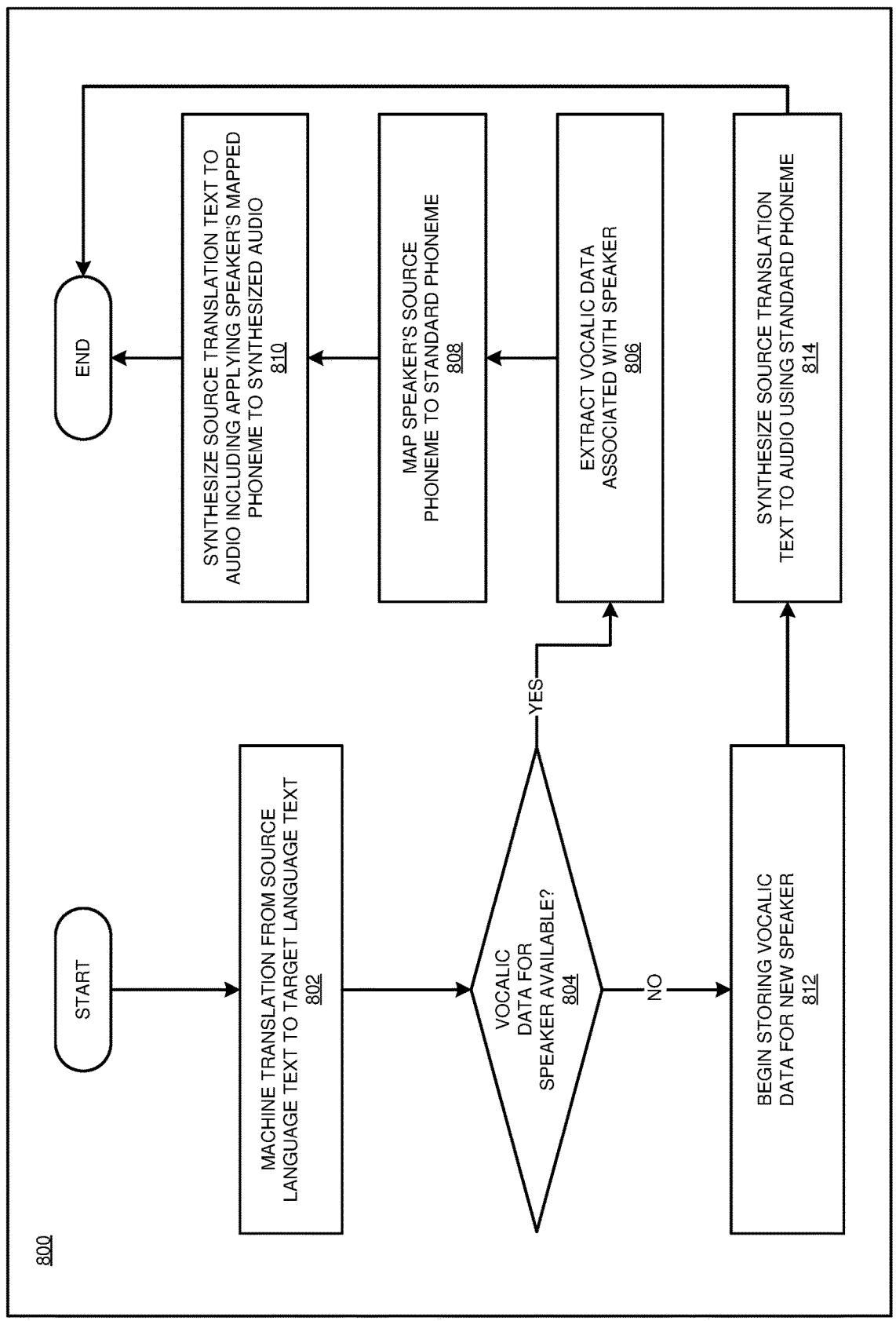
FIG. 8 depicts a flowchart of an example process for a customized para-dubbing synthesis process in accordance with an illustrative embodiment.

With reference to FIG. 8, this figure depicts a flowchart of an example process 800 for a customized para-dubbing synthesis process in accordance with an illustrative embodiment. In some embodiments, the process 800 is performed at block 716 of the process 700 of FIG. 7. In some embodiments, the process 800 is performed by a CPDS server deployed in a cloud computing environment, for example CPDS server 400 in cloud computing environment service infrastructure 300 of FIG. 3.

In an embodiment, at block 802, the process performs a machine translation of text from a source language to a target language. In an embodiment, the text originated from an audio signal from a recording of the text being spoken by a specific person, such as a performer in an audio or video presentation. At block 804, the process determines if vocalic data for speaker is available. For example, in an embodiment, the process queries a database storing a repository of sample audio, such as recorded audio of performers, including a plurality of phonemes for each performer. If vocalic data for the speaker is found, the process proceeds to block 806 where the process extracts vocalic data associated with speaker. In an embodiment, at block 808, the process receives the custom phonemes of the speaker from a database and maps the speaker's source-language phenomes to standard phonemes of a target language. For example, in an embodiment, the process attempts to associate each custom phoneme with a standard phoneme of a standard phoneme sequence of the target language by associating the speaker's phoneme pronunciation in the source language to standard phonemes in the target language. Next, at block 810, the process synthesizes audio in the target language that was translated from the source language. In an embodiment, the process uses the speaker's mapped phoneme audio as part of the synthesized audio.

Referring again to block 804, if the process determines that vocalic data for the speaker is not available, the process proceeds to block 812. At block 812, the process considers the speaker to be a new speaker and begins storing vocalic data for the new speaker. At block 814, in the absence of vocalic data for the speaker, the process synthesizes source translation text to audio using standard phonemes. In an embodiment, the process selects standard phonemes that most closely match characteristics of the speaker. In an alternative embodiment, the process phases in phonemes of the speaker as they accumulate in memory and become available for use.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
converting, by a processor, an original audio signal to an original text string, wherein the original audio signal is from a recording of the original text string being spoken by a specific person, wherein the original audio signal corresponds to an original audio generated by the specific person while speaking the original text, and wherein the original text string includes a word in a source language;
generating, by the processor, a translated text string by translating the original text string from the source language to a target language, wherein the translated text string includes, as a translated word, a translation of the word from the source language to a target language;
assembling, by the processor, a standard phoneme sequence from a set of standard phonemes, wherein the standard phoneme sequence includes a standard pronunciation of the translated word;
associating, by the processor, a custom phoneme with a standard phoneme of the standard phoneme sequence, wherein the custom phoneme includes the pronunciation of a sound in the translated word by the specific person, wherein the pronunciation reflects a voice of the specific person while speaking the original audio, and wherein an emotional state of the specific person while speaking the original audio is obtained from a video recording of the specific person while recording the original audio;
synthesizing, by the processor, the translated text string to a translated audio signal that includes the translated word pronounced using the custom phoneme;
storing the translated audio signal in a data structure associated with an alphanumeric voice identifier, wherein the alphanumeric voice identifier comprises a performer identifier and the emotional state, wherein the performer identifier is indicative of the specific person and wherein the emotional state is indicative of an emotion expressed by the specific person in the original recording; and
indexing the original text string, wherein the indexing comprises using the voice identifier to associate the original text with the specific person.

2. The computer-implemented method of claim 1, further comprising:
extracting the original audio signal from sequential data representative of sequentially matched multimedia content.

3. The computer-implemented method of claim 1, further comprising:
generating a query voice print from the original audio signal;
searching a database for a matching voice print that matches the query voice print; and
associating the specific person with an identifier associated with the matching voice print.

4. The computer-implemented method of claim 3, further comprising:
associating the original text string with the identifier associated with the matching voice print.

5. The computer-implemented method of claim 4, further comprising:
retrieving the custom phoneme from memory based on the custom phoneme being associated with the identifier associated with the specific person.

6. The computer-implemented method of claim 1, further comprising associating, in memory, the custom phoneme with a matching standard phoneme, comprising:
identifying sample text in the source language associated with the custom phoneme;
identifying a matching standard phoneme associated with the sample text; and
associating the custom phoneme with the matching standard phoneme.

7. The computer-implemented method of claim 6, wherein the custom phoneme is one of a plurality of different custom phonemes, and
wherein the method further comprises associating, in memory, each of the plurality of custom phonemes with respective standard phonemes of the set of standard phonemes.

8. The computer-implemented method of claim 1, wherein the custom phoneme is from a set of custom phonemes extracted from recorded utterances of the specific person.

9. The computer-implemented method of claim 1, wherein the target language is one of a plurality of different target languages, and
wherein the generating of the translated text string comprises generating a plurality of translated text strings, the generating of the plurality of translated text strings comprising translating the original text string from the source language to each of the plurality of target languages.

10. The computer-implemented method of claim 9, wherein the plurality of translated text strings include, as translated words, respective translations of the word from the source language to each of the plurality of target languages.

11. The computer-implemented method of claim 10, wherein the assembling of the standard phoneme sequence comprises assembling standard phoneme sequences for respective target languages including standard pronunciations of the translated words.

12. The computer-implemented method of claim 11, wherein the associating of the custom phoneme with the standard phoneme comprises associating custom phonemes with standard phonemes of the standard phoneme sequences, wherein the custom phoneme includes the specific person's pronunciations of respective sounds in the translated words.

13. A computer program product comprising one or more computer readable storage media, and program instructions collectively stored on the one or more computer readable storage media, the program instructions executable by a processor to cause the processor to perform operations comprising:
converting, by a processor, an original audio signal to an original text string, wherein the original audio signal is from a recording of the original text string being spoken by a specific person, wherein the original audio signal corresponds to an original audio generated by the specific person while speaking the original text, and wherein the original text string includes a word in a source language;

generating, by the processor, a translated text string by translating the original text string from the source language to a target language, wherein the translated text string includes, as a translated word, a translation of the word from the source language to a target language;

assembling, by the processor, a standard phoneme sequence from a set of standard phonemes, wherein the standard phoneme sequence includes a standard pronunciation of the translated word;

associating, by the processor, a custom phoneme with a standard phoneme of the standard phoneme sequence, wherein the custom phoneme includes the pronunciation of a sound in the translated word by the specific person, wherein the pronunciation reflects a voice of the specific person while speaking the original audio, and wherein an emotional state of the specific person while speaking the original audio is obtained from a video recording of the specific person while recording the original audio;

synthesizing, by the processor, the translated text string to a translated audio signal that includes the translated word pronounced using the custom phoneme;

storing the translated audio signal in a data structure associated with an alphanumeric voice identifier, wherein the alphanumeric voice identifier comprises a performer identifier and the emotional state, wherein the performer identifier is indicative of the specific person and wherein the emotional state is indicative of an emotion expressed by the specific person in the original recording; and indexing the original text string, wherein the indexing comprises using the voice identifier to associate the original text with the specific person.

14. The computer program product of claim 13, wherein the stored program instructions are stored in a computer readable storage device in a data processing system, and wherein the stored program instructions are transferred over a network from a remote data processing system.

15. The computer program product of claim 13, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

16. The computer program product of claim 13, further comprising:

generating a query voice print from the original audio signal;

searching a database for a matching voice print that matches the query voice print; and associating the specific person with an identifier associated with the matching voice print.

17. The computer program product of claim 13, further comprising associating, in memory, the custom phoneme with a matching standard phoneme, comprising:

identifying sample text in the source language associated with the custom phoneme;

identifying a matching standard phoneme associated with the sample text; and associating the custom phoneme with the matching standard phoneme.

18. A computer system comprising a processor and one or more computer readable storage media, and program instructions collectively stored on the one or more computer readable storage media, the program instructions executable by the processor to cause the processor to perform operations comprising:

converting, by a processor, an original audio signal to an original text string, wherein the original audio signal is from a recording of the original text string being spoken by a specific person, wherein the original audio signal corresponds to an original audio generated by the specific person while speaking the original text, and wherein the original text string includes a word in a source language;

generating, by the processor, a translated text string by translating the original text string from the source language to a target language, wherein the translated text string includes, as a translated word, a translation of the word from the source language to a target language;

assembling, by the processor, a standard phoneme sequence from a set of standard phonemes, wherein the standard phoneme sequence includes a standard pronunciation of the translated word;

associating, by the processor, a custom phoneme with a standard phoneme of the standard phoneme sequence, wherein the custom phoneme includes the pronunciation of a sound in the translated word by the specific person, wherein the pronunciation reflects a voice of the specific person while speaking the original audio, and wherein an emotional state of the specific person while speaking the original audio is obtained from a video recording of the specific person while recording the original audio;

synthesizing, by the processor, the translated text string to a translated audio signal that includes the translated word pronounced using the custom phoneme;

storing the translated audio signal in a data structure associated with an alphanumeric voice identifier, wherein the alphanumeric voice identifier comprises a performer identifier and the emotional state, wherein the performer identifier is indicative of the specific person and wherein the emotional state is indicative of an emotion expressed by the specific person in the original recording; and indexing the original text string, wherein the indexing comprises using the voice identifier to associate the original text with the specific person.

19. The computer system of claim 18, further comprising:

generating a query voice print from the original audio signal;

searching a database for a matching voice print that matches the query voice print; and associating the specific person with an identifier associated with the matching voice print.

20. The computer system of claim 18, further comprising associating, in memory, the custom phoneme with a matching standard phoneme, comprising:

identifying sample text in the source language associated with the custom phoneme;

identifying a matching standard phoneme associated with the sample text; and associating the custom phoneme with the matching standard phoneme.

* * * * *